US006206070B1

(12) United States Patent
Salmon

(10) Patent No.: US 6,206,070 B1
(45) Date of Patent: Mar. 27, 2001

(54) HOLE PUNCH REINFORCER

(76) Inventor: Avraham Salmon, P.O. Box 6497, Ganey Yehuda (IL), 56905

( * ) Notice: Subject to any disclaimer, the term of this patent is extended or adjusted under 35 U.S.C. 154(b) by 0 days.

(21) Appl. No.: 09/231,662

(22) Filed: Jan. 15, 1999

(51) Int. Cl.[7] .............................. B26D 7/00; B32B 31/00

(52) U.S. Cl. .......................... 156/513; 156/515; 156/530; 156/564; 156/565; 156/251; 156/252; 156/299

(58) Field of Search .................................... 156/251, 515, 156/530, 252, 299, 513, 564, 565, 570

(56) References Cited

U.S. PATENT DOCUMENTS

| | | | | |
|---|---|---|---|---|
| 1,800,460 | * | 4/1931 | Maclean | 156/564 |
| 3,289,509 | | 12/1966 | Cahill | 83/140 |
| 3,457,815 | | 7/1969 | Cahill | 83/140 |
| 4,028,170 | * | 6/1977 | Savarimuthu | 156/513 |
| 4,072,554 | | 2/1978 | McKibben | 156/514 |
| 4,289,565 | | 9/1981 | Wilkins | 156/514 |
| 4,310,379 | | 1/1982 | Harrison | 156/541 |
| 4,746,394 | | 5/1988 | Sueta et al. | 156/513 |
| 4,822,446 | | 4/1989 | Hansen | 156/513 |
| 4,826,561 | * | 5/1989 | Carroll | 156/518 |
| 4,909,893 | | 3/1990 | Lee | 156/513 |
| 5,188,694 | | 2/1993 | Hashida et al. | 156/353 |

* cited by examiner

*Primary Examiner*—Linda L. Gray
(74) *Attorney, Agent, or Firm*—Aquilino, Welsh & Flaxman

(57) ABSTRACT

A reinforcing hole punch including a reciprocating punch member supported for movement toward a base is disclosed. The reciprocating punch member is actuated to form a hole within a sheet of paper positioned on the base. The hole punch also includes a dispensing sleeve positioned about the punch member, defining a space between an inner wall of the dispensing sleeve and the punch member, in which reinforcing members are positioned for attachment to a sheet of paper when the punch member is actuated to form a hole within a sheet of paper.

20 Claims, 4 Drawing Sheets

HOLE PUNCH REINFORCER

BACKGROUND OF THE INVENTION

1. Field of the Invention

The invention relates to a paper hole punch. More particularly, the invention relates to a paper hole punch which applies a reinforcing member to a sheet of paper as a hole is created in the sheet of paper.

2. Description of the Prior Art

Hole punches for creating a series of holes in a sheet of paper are well known. In most instances, the holes are created so that the sheet of paper may be securely placed within a binder. Unfortunately, however, holes made in this manner are often fragile, and may easily be torn from the binder.

Reinforcing members have, therefore, been developed for positioning about holes created within a sheet of paper. These reinforcing members are commonly applied to the sheet of paper after the holes have been formed by a hole punch. Hole punches have been developed for applying reinforcing members adjacent formed holes as the holes are created by the hole punch. These prior hole punches are generally difficult to use and do not efficiently apply reinforcing members to a sheet of paper as holes are created therein.

As a result, a need exists for a hole punch which efficiently and effectively applies reinforcing members about a hole generated when the hole punch cuts through a sheet of paper. The present invention provides such a hole punch.

SUMMARY OF THE INVENTION

It is, therefore, an object of the present invention to provide a reinforcing hole punch including a reciprocating punch member supported for movement toward a base. The reciprocating punch member is actuated to form a hole within a sheet of paper positioned on the base. The hole punch also includes a dispensing sleeve positioned about the punch member, defining a space between an inner wall of the dispensing sleeve and the punch member, in which reinforcing members are positioned for attachment to a sheet of paper when the punch member is actuated to form a hole within a sheet of paper.

It is also an object of the present invention to provide a hole punch wherein the dispensing sleeve includes an open end adjacent a distal end of the punch member, and the open end includes a stopper for controlling the dispensing of reinforcing members.

It is another object of the present invention to provide a hole punch wherein the stopper includes an opening slightly smaller than the reinforcing members to control the dispensing of the reinforcing members until the punch member is actuated to form a hole within a sheet of paper.

It is a further object of the present invention to provide a hole punch wherein a spring is positioned within the dispensing sleeve to force a reinforcing member into contact with a sheet of paper when the punch member is actuated to form a hole in the sheet of paper.

It is also an object of the present invention to provide a hole punch wherein the dispensing sleeve is releasably positioned about the punch member.

It is another object of the present invention to provide a hole punch including a second reciprocating punch member supported for movement toward the base, wherein the second reciprocating punch member is actuated to form a hole within a sheet of paper positioned on the base. The hole punch also includes a second dispensing sleeve positioned about the second punch member to define a space between an inner wall of the second dispensing sleeve and the second punch member in which reinforcing members are positioned for attachment to a sheet of paper when the second punch member is actuated to form a hole within a sheet of paper.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
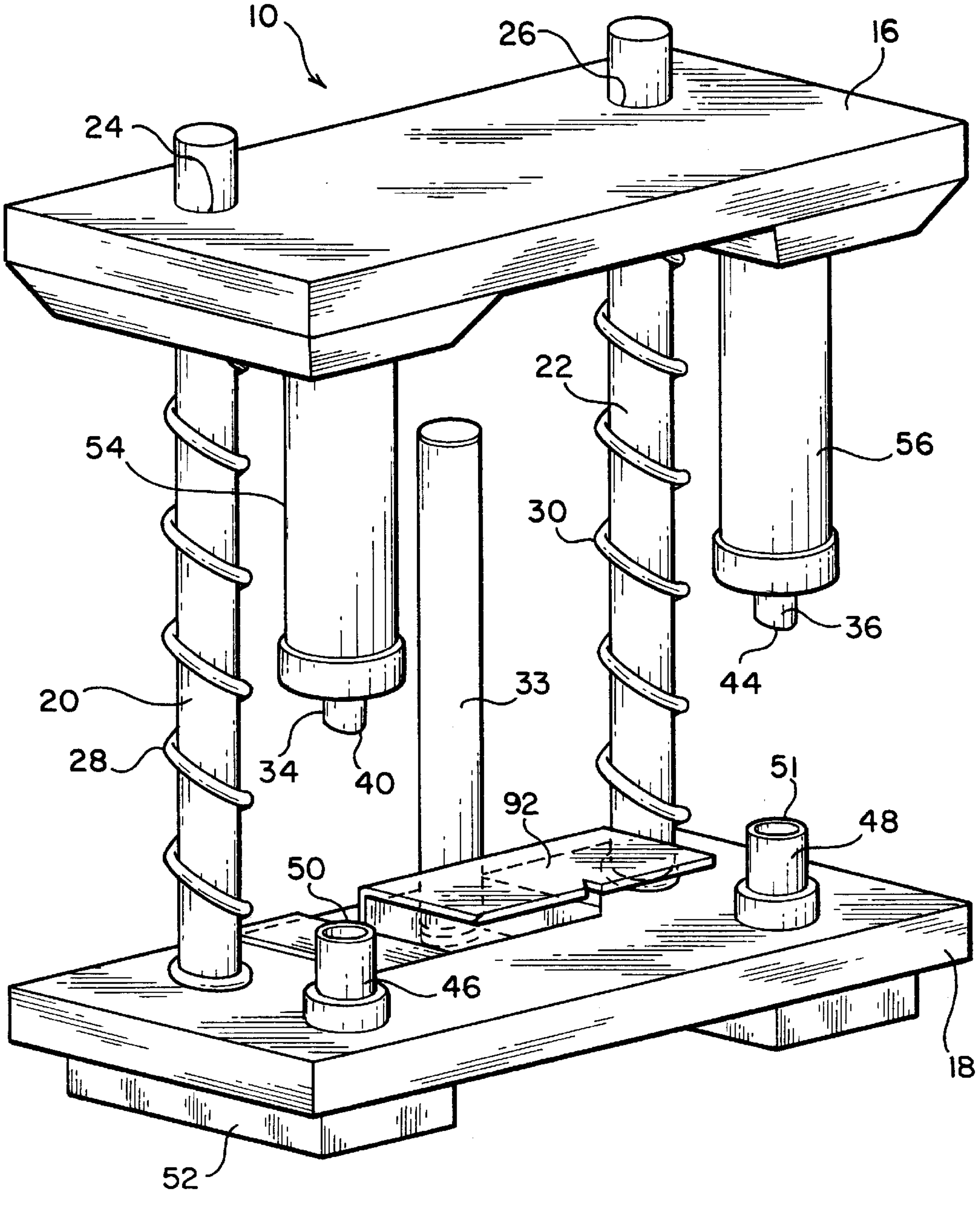
FIG. 1 is a perspective view of the present hole punch reinforcer.
Figure 2:
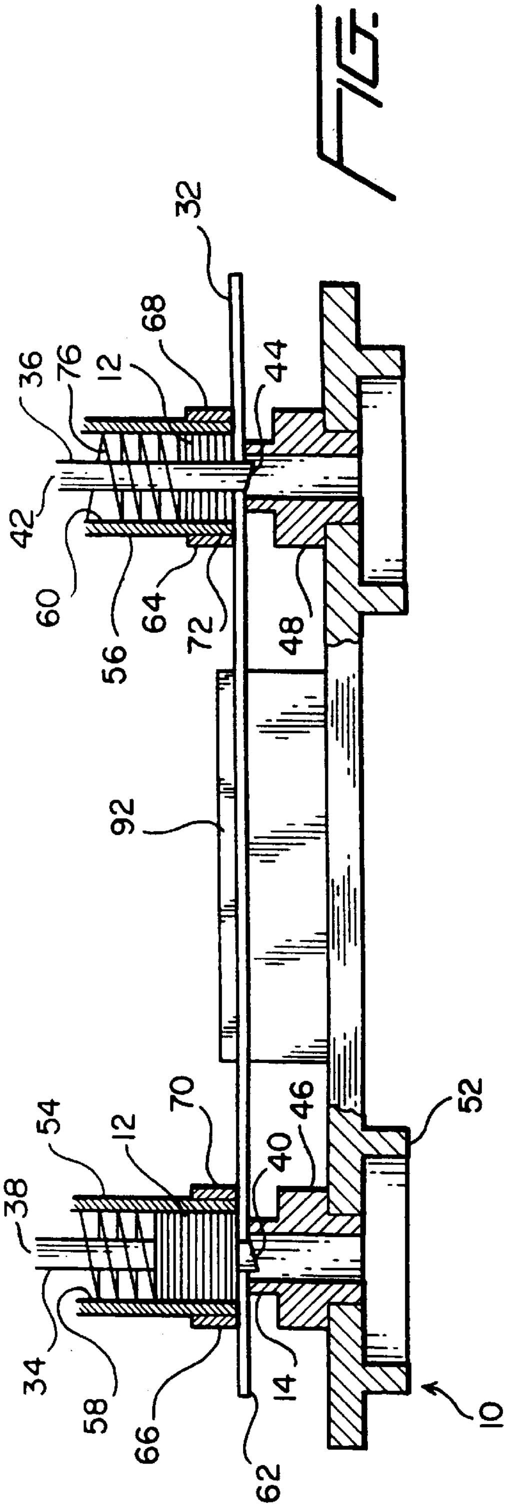
FIG. 2 is a cross sectional view of the present hole punch in the puncturing position.
Figure 3:
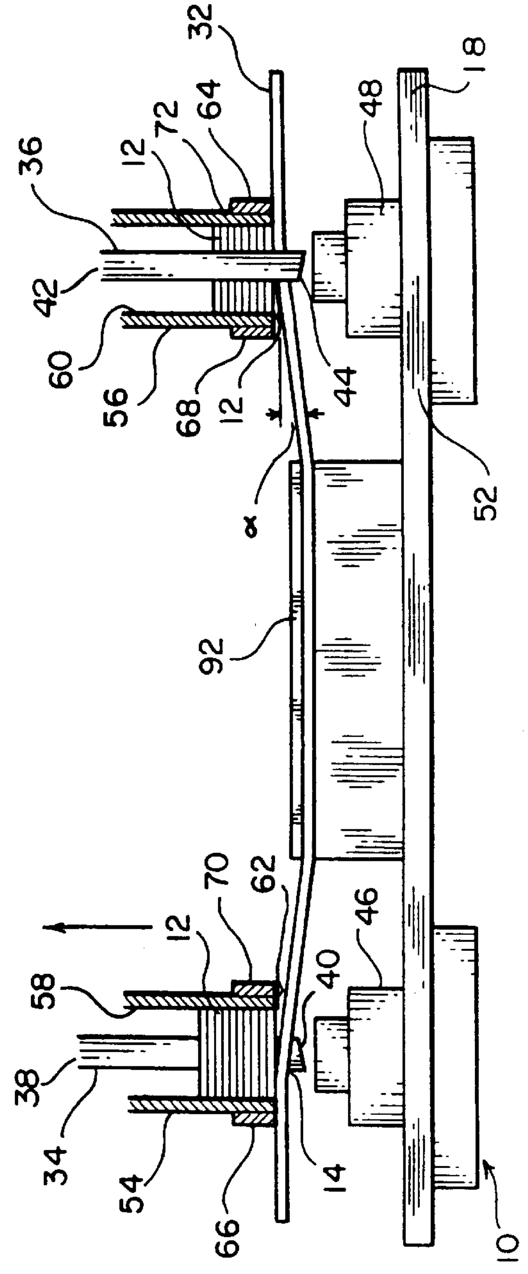
FIG. 3 is a cross sectional view of the present hole punch in the separation point of the first reinforcing member from the second reinforcing member.
Figure 4:
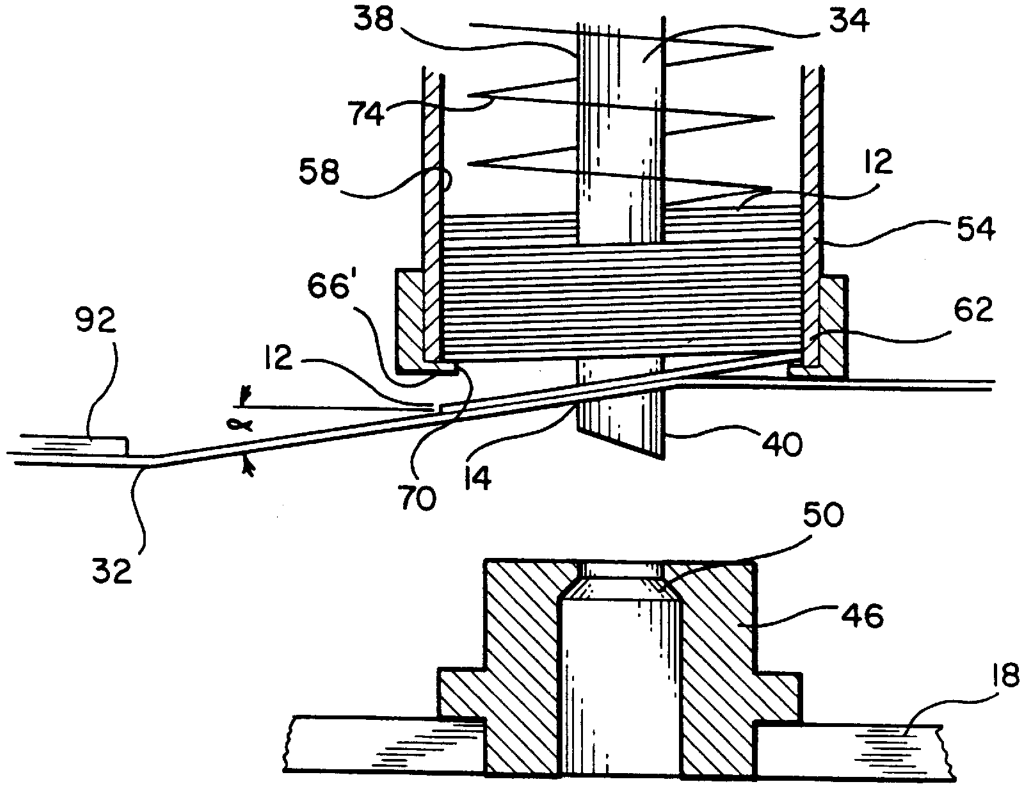
FIG. 4 is detailed view showing the separation point and angle $\alpha$ of the paper.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1–8, the present hole punch 10 is disclosed. While the present hole punch 10 is described for use with a sheet of paper, the punch may be used for various objects without departing from the spirit of the present invention. The hole punch 10 applies reinforcing members 12 about a hole 14 as the hole punch 10 creates the hole 14. This obviates the need for later applying reinforcing members about a punched hole. The reinforcing members 12 include a central hole 13, a top wax 93 surface and a bottom adhesive surface 94.

The hole punch 10 includes an actuating member 16 coupled to a base 18 by first and second support arms 20, 22. The actuating member 16 rides upon the first and second support arms 20, 22 via respective first and second guide holes 24, 26 formed in the actuating member 16. First and second springs 28, 30 respectively positioned on the first and second support arms 20, 22, and between the actuating member 16 and the base 18, bias the actuating member 16 from the base 18. In this way, the actuating member 16 is forced back to a starting position after the actuating member

16 is pushed downwardly to punch a hole 14 within a sheet of paper 32. Downward movement of the actuating member 16 is controlled by a motion limiter 33 which controls downward movement of the actuating member 16.

The actuating member 16 supports first and second punch members 34, 36 for movement toward the base 18. Specifically, the first punch member 34 is provided with a proximal end 38 and a distal end 40, and the second punch member 36 is provided with a proximal end 42 and a distal end 44. The proximal end 38, 42 of each of the first and second punch members 34, 36 is engaged with the actuating member 16 such that the first and second punch members 34, 36 move downwardly when the actuating member 16 is pushed toward the base 18. The distal end 40, 44 of each of the first and second punch members 34, 36 is free and cuts a hole 14 within a sheet of paper 32 when the first and second punch members 34, 36 are forced toward the base 18 and into contact with the sheet of paper 32. While the present hole punch 10 is disclosed as having two punch members, a single punch member or additional punch members could be provided without departing from the spirit of the present invention.

As with conventional hole punches, the present hole punch 10 includes a base 18 with first and second anvils 46, 48 respectively positioned in line with the first and second punch members 34, 36. Each of the first and second anvils 46, 48 includes a hole 50 through which the distal ends 40, 44 of the respective first and second punch members 34, 36 pass when a hole 14 is cut in a sheet of paper 32. As a result, the paper cut to create the hole 14 is forced within holes 50, 51 formed in the first and second anvils 46, 47, and into a storage compartment 52 formed within the base 18 of the hole punch 10.

Dispensing sleeves 54, 56 are positioned about the first and second punch members 34, 36 to supply reinforcing members 12 that are applied to the sheet of paper 32 as the punch members 34, 36 cut holes 14 therein. The dispensing sleeves 54, 56 are preferrably made from metal or plastic, although a wide variety of materials may be used without departing from the spirit of the present invention. The first dispensing sleeve 54 houses a plurality of reinforcing members 12 and is concentrically positioned about the reciprocating first punch member 34 such that a plurality of reinforcing members 12 are positioned between the punch member 34 and an inner wall 58 of the first dispensing sleeve 54. That is, the first punch member 34 and the inner wall 58 of the first dispensing sleeve 54 define an annular space in which the annular shaped reinforcing members 12 are stored.

Similarly, the second dispensing sleeve 56 houses a plurality of reinforcing members 12 and is concentrically positioned about the second reciprocating punch member 36 such that a plurality of reinforcing members 12 are positioned between the second punch member 36 and an inner wall 60 of the second dispensing sleeve 56. As with the first dispensing sleeve 54, the second punch member 36 and the inner wall 60 of the second dispensing sleeve 56 define an annular space in which the annular shaped reinforcing members 12 are stored. Although the dispensing sleeves and the punch members are disclosed as defining an annular space in which the reinforcing members are positioned, the dispensing sleeves and punch members may take on a variety of shapes without departing from the spirit of the present invention.

Each of the dispensing sleeves 54, 56 also includes an open end 62, 64 adjacent the distal end 40, 44 of the respective punch members 34, 36. In this way, the reinforcing members 12 are selectively released from the first and second dispensing sleeves 54, 56 for attachment to a sheet of paper 32 as a hole 14 is created by the respective first and second punch members 34, 36. Stoppers 62, 64 are secured adjacent the open end 66, 68 of each of the first and second dispensing sleeves 54, 56. The stoppers 66, 68 control the dispensing of reinforcing members 12 from the first and second dispensing sleeves 54, 56. Each stopper 66, 68 includes an opening 70, 72 slightly smaller than the reinforcing members 12. As such, the stoppers 66, 68 create a ledge upon which the reinforcing members 12 sit until the reinforcing members 12 are brought into contact with a sheet of paper 32. Specifically, the reinforcing members 12 are brought into contact with the sheet of paper 32 as the distal ends 40, 44 of the first and second punch members 34, 36 cut holes within the sheet of paper 32.

With this in mind, each of the dispensing sleeves 54, 56 is provided with a spring 74, 76 (or weight member). The spring 74, 76 forces the stack of reinforcing members 12 downward to ensure that the bottom reinforcing member contacts the sheet of paper 32 when the first and second punch members 34, 36 are moved downwardly into contact with the sheet of paper 32.

Figure 7:
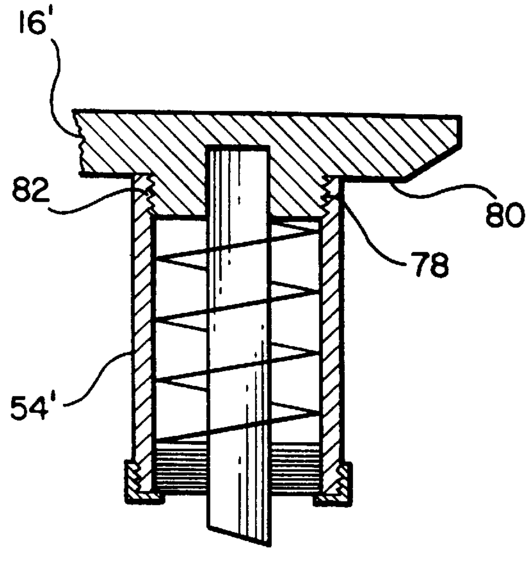
FIG. 7 is a detailed cross sectional view showing the attachment of the dispensing sleeve.
Figure 8:
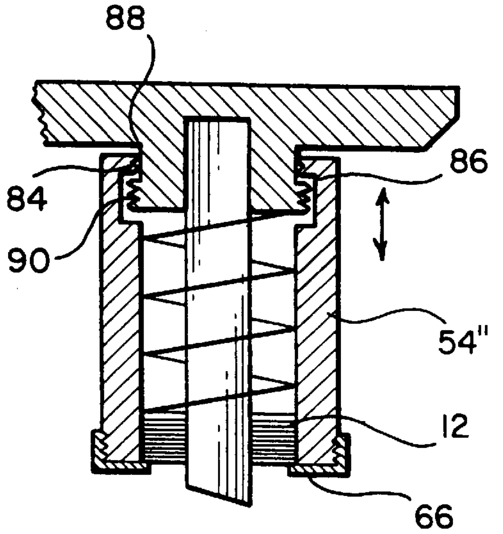
FIG. 8 is a detailed cross sectional view of an alternate embodiment showing a flexible connection for the dispensing sleeve.
Figure 5:
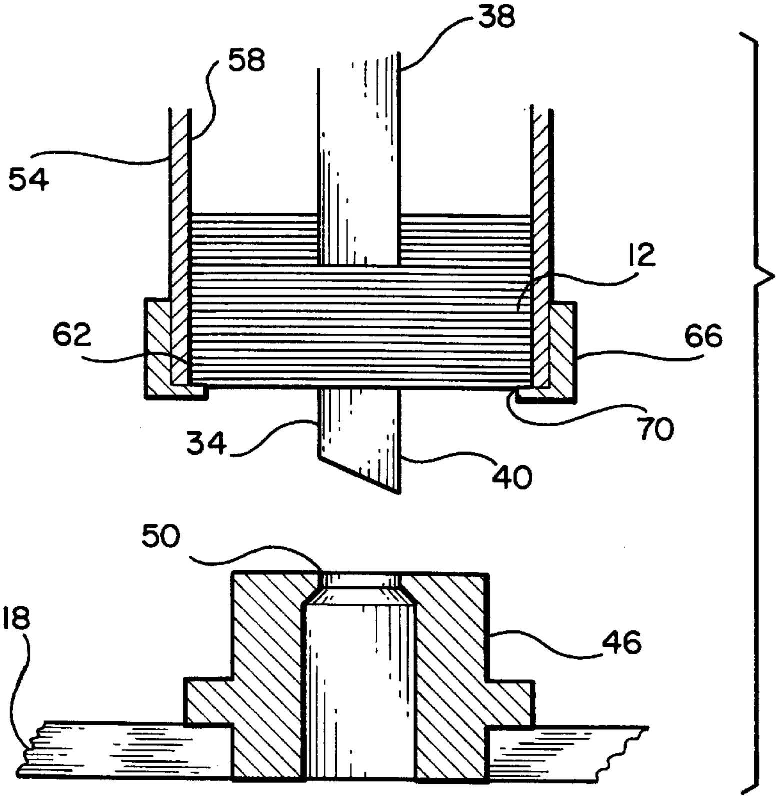
FIG. 5 is a cross sectional view showing the manner in which the stopper supports the reinforcing members.
Figure 6:
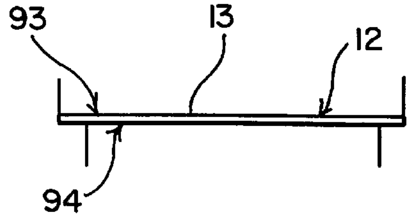
FIG. 6 is a side view of a reinforcing member.

With reference to FIGS. 7 and 8, alternate embodiments for attaching the first and second dispensing sleeves 54, 56 are disclosed. Whether the embodiment of FIG. 7 or FIG. 8 is employed, the dispensing sleeves 54, 56 are releasably attached to the actuating member 16 such that they may be readily refilled by removing them from the actuating member 16 and simply placing additional reinforcing members 12 therein.

In accordance with the embodiment disclosed in FIG. 7, the dispensing sleeve 54' includes internal threading 78 along its proximal end 80 which engages a threaded abutment 82 extending from the actuating member 16'. A flexible attachment is disclosed in FIG. 8 in which the dispensing sleeve 54" includes a minimal internal threading 84 followed by an internal rim 86. The internal threading 84 is designed to engage an abutment 88 formed on the actuating member 16". The abutment 88 is threaded 90 along its end such that the internal threading 84 passes thereby and the threading 90 on the end of the abutment 88 is held within the internal rim 86.

In use, a sheet of paper 32 is placed on the anvils 46, 48 and below the paper stopper 92. The actuating member 16 is then pushed toward the base 18 against the pressure of the first and second springs 28, 30. Movement of the actuating member 16 forces the first and second punch members 34, 36 into contact with the sheet of paper 32 and the cutting edges of the first and second punch members 34, 36 cut holes 14 through the sheet of paper 32. At the same time, the first and second anvils 46, 48 push the paper 32 toward the reinforcing members 12 located at the bottom of the first and second dispensing sleeves 54, 56. As this occurs, the exposed adhesive portions 94 of the bottom reinforcing members 12 found in the first and second dispensing sleeves 54, 56 contact the sheet of paper 32 adjacent the hole 14 being formed in the sheet of the paper 32. Contact with the sheet of paper forms a relatively strong adhesive bond.

When the user ceases to push the actuating member 16, the first and second springs 28, 30 force the dispensing sleeves 54, 56 and punch members 34, 36 from the anvils 46, 48. When disengagement occurs, the sheet of paper 32 is pulled always from the anvils 46, 48 because it is bound to be reinforcing members 12 still held in the dispensing sleeves 54, 56. At this point, the paper stopper 92 prevents further movement of the paper 32 and a separation angle α is created. The strong adhesive bond between the paper 32 and the reinforcing members 12 generates force at the separation angle α which pulls the reinforcing members 12 from their respective sleeves 54, 56. In this way, the bottom reinforcing member is pulled from its adjacent reinforcing member and the adjacent reinforcing member becomes the bottom reinforcing member.

Figure 9:
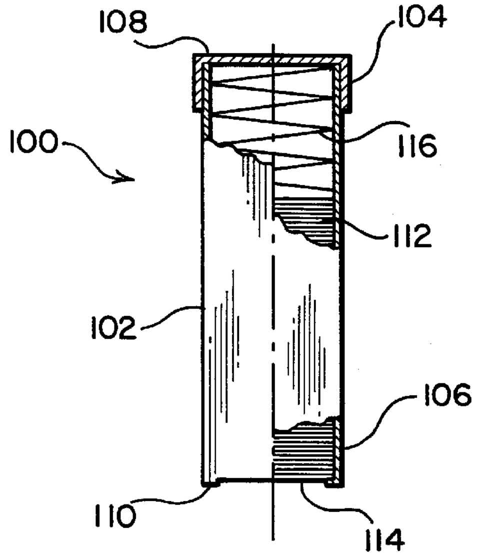
FIG. 9 is a cross sectional view of a reinforcing member stamp.

With reference to FIG. 9, a reinforcement stamp 100 is disclosed. The stamp 100 is substantially similar in function to the dispensing sleeves discussed above with regard to FIGS. 1–8. However, the stamp 100 allows individuals to readily apply reinforcing members 112 at desired locations without employing the entire punch assembly.

The stamp 100 includes a cylindrical sleeve 102 having an open first end 104 and an open second end 106. A cap 108 is applied to the first end 104 to selectively cover the first end 104. As such, individuals may selectively refill the stamp 100 by removing the cap 108 and inserting new reinforcing members 112 within the sleeve 102.

The second end 106 of the sleeve 102 is covered in a manner permitting the selective release of the reinforcing members 112. Specifically, a stopper 110 is secured to the open second end 106 of the sleeve 102. The stopper 110 controls the dispensing of reinforcing members 112 from the stamp 100. The stopper 110 defines an opening 114 slightly smaller than the reinforcing members 112. As such, the stopper 110 creates a ledge upon which the reinforcing members 112 sit until the reinforcing members 112 are brought into contact with a sheet of paper. Specifically, the reinforcing members 112 are brought into contact with the sheet of paper as the second end 106 of the sleeve 102 is pressed onto a sheet of paper.

With this in mind, the sleeve 102 is provided with a spring 116 (or weight member). The spring 116 forces the stack of reinforcing members 112 downwardly to ensure that the bottom reinforcing member contacts the sheet of paper when the stamp 100 is brought into contact with a sheet of paper.

Release of the reinforcing members 112 occurs in much the same manner as with the embodiments disclosed in FIGS. 1–8. Specifically, the second 106 of the sleeve 102 is brought into contact with a sheet of paper. The adhesive portion of the reinforcing member 112 forms a bond with the paper. As a result, when the second end 106 of the sleeve 102 is drawn away from the paper, the reinforcing member 112 is pulled from the sleeve 102 and remains on the paper.

While the preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A reinforcing hole punch, comprising:

a reciprocating punch member supported for movement toward a base, the reciprocating punch member being actuated to form a hole within an object positioned on the base;

a dispensing sleeve positioned about the punch member to define a space between an inner wall of the dispensing sleeve and the punch member in which reinforcing members are positioned for attachment to the object when the punch member is actuated to form the hole within the object.

2. The reinforcing hole punch according to claim 1, wherein the dispensing sleeve includes an open end adjacent a distal end of the punch member, the open end having a stopper for controlling the dispensing of the reinforcing members.

3. The reinforcing hole punch according to claim 2, wherein the stopper includes an opening slightly smaller than the reinforcing members to control the dispensing of the reinforcing members until the punch member is actuated to form the hole within the object.

4. The reinforcing hole punch according to claim 3, wherein a spring is positioned within the dispensing sleeve to force a reinforcing member into contact with the object when the punch member is actuated to form the hole in the object.

5. The reinforcing hole punch according to claim 1, wherein the dispensing sleeve is releasably positioned about the punch member.

6. The reinforcing hole punch according to claim 1, further including a second reciprocating punch member supported for movement toward the base, the second reciprocating punch member being actuated to form a hole within the object positioned on the base;

a second dispensing sleeve positioned about the second punch member to define a space between an inner wall of the second dispensing sleeve and the second punch member in which reinforcing members are positioned for attachment to the object when the second punch member is actuated to form the hole within the object.

7. The reinforcing hole punch according to claim 6, wherein the dispensing sleeve includes an open end adjacent a distal end of the punch member, the open end having a stopper for controlling the dispensing of the reinforcing members; and the second dispensing sleeve includes an open end adjacent a distal end of the second punch member, the open end having a second stopper for controlling the dispensing of the reinforcing members.

8. The reinforcing hole punch according to claim 7, wherein the stopper includes an opening slightly smaller than the reinforcing members to control the dispensing of the reinforcing members until the punch member is actuated to form the hole within the object; and the second stopper includes an opening slightly smaller than the reinforcing members to control the dispensing of the reinforcing members until the second punch member is actuated to form the hole within the object.

9. The reinforcing hole punch according to claim 8, wherein a spring is positioned within the dispensing sleeve to force a reinforcing member into contact with the object when the punch member is actuated to form a hole in the object; and a second spring is positioned within the second dispensing sleeve to force a reinforcing member into contact with the object when the second punch member is actuated to form a hole in the object.

10. The reinforcing hole punch according to claim 6, wherein the space between the inner wall of the dispensing sleeve and the punch member is an annular space, and the reinforcing members are annular shaped; and the space between the inner wall of the second dispensing sleeve and the second punch member is an annular space, and the reinforcing members are annular shaped.

11. A hole punch applying reinforcing members about a hole created when the hole punch is actuated to create the hole within an object, comprising:

a reciprocating punch member supported for movement toward a base, the reciprocating punch member being actuated to form the hole within the object positioned on the base;

a dispensing sleeve housing a plurality of reinforcing members, the dispensing sleeve being positioned about the reciprocating punch member such that the plurality of reinforcing members are positioned between the punch member and an inner wall of the dispensing sleeve, the dispensing sleeve also including an open end adjacent a distal end of the punch member whereby a reinforcing member is applied to the object as the punch member forms the hole within the object.

12. The reinforcing hole punch according to claim 11, wherein the open end includes a stopper for controlling the dispensing of the reinforcing members.

13. The reinforcing hole punch according to claim 12, wherein the stopper includes an opening slightly smaller than the reinforcing members to control the dispensing of the reinforcing members until the punch member is actuated to form the hole within the object.

14. The reinforcing hole punch according to claim 13, wherein a spring is positioned within the dispensing sleeve to force a reinforcing member into contact with the object when the punch member is actuated to form the hole in the object.

15. The reinforcing hole punch according to claim 11, wherein the dispensing member is releasably positioned about the punch member.

16. The reinforcing hole punch according to claim 11, further including a second reciprocating punch member supported for movement toward the base, the second reciprocating punch member being actuated to form a hole within the object positioned on the base;

a second dispensing sleeve housing a plurality of reinforcing members, the second dispensing sleeve being positioned about the second reciprocating punch member such that the plurality of reinforcing members are positioned between the second punch member and an inner wall of the second dispensing sleeve, the second dispensing sleeve also including an open end adjacent a distal end of the second punch member whereby a reinforcing member is applied to the object as the second punch member forms the hole within the object.

17. The reinforcing hole punch according to claim 16, wherein the open end of the dispensing sleeve includes a stopper for controlling the dispensing of reinforcing members; and the open end of the second dispensing sleeve includes a second stopper for controlling the dispensing of reinforcing members.

18. The reinforcing hole punch according to claim 17, wherein the stopper includes an opening slightly smaller than the reinforcing members to control the dispensing of the reinforcing members until the punch member is actuated to form the hole within the object; and the second stopper includes an opening slightly smaller than the reinforcing members to control the dispensing of the reinforcing members until the second punch member is actuated to form the hole within the object.

19. The reinforcing hole punch according to claim 18, wherein a spring is positioned within the dispensing sleeve to force a reinforcing member into contact with the object when the punch member is actuated to form the hole in the object; and a second spring is positioned within the second dispensing sleeve to force a reinforcing member into contact with the object when the second punch member is actuated to form the hole in the object.

20. The reinforcing hole punch according to claim 16, wherein the space between the inner wall of the dispensing sleeve and the punch member is an annular space, and the reinforcing members are annular shaped; and the space between the inner wall of the second dispensing sleeve and the second punch member is an annular space, and the reinforcing members are annular shaped.

* * * * *